United States Patent [19]

Hawley

[11] Patent Number: 4,658,171

[45] Date of Patent: Apr. 14, 1987

[54] ENGINE FOR CONVERSION OF THERMAL RADIATION TO DIRECT CURRENT

[76] Inventor: James M. Hawley, 4272 Queen Ave. S., Minneapolis, Minn. 55410

[21] Appl. No.: 754,591

[22] Filed: Jul. 15, 1985

[51] Int. Cl.⁴ .............................................. H02N 7/00
[52] U.S. Cl. ..................................... 310/306; 307/151
[58] Field of Search ................. 310/306, 307; 307/151

[56] References Cited

U.S. PATENT DOCUMENTS 3,535,543 10/1970 Dailey .............................. 310/306 X
4,445,050 4/1984 Marks .............................. 307/151 X Primary Examiner—Donovan F. Duggan
Attorney, Agent, or Firm—Hugh D. Jaeger

[57] ABSTRACT

The present invention is directed to an engine and method for converting heat energy to electrical current. The engine includes a heat source with a heat exchanger. Dipole antennas receive heat energy and immediately convert it to electrical current which is then rectified before flowing to a load.

5 Claims, 3 Drawing Figures

ENGINE FOR CONVERSION OF THERMAL RADIATION TO DIRECT CURRENT

FIELD OF THE INVENTION

The present invention is directed to an energy conversion device which converts thermal energy to electrical current.

BACKGROUND OF THE INVENTION

Presently, other than the hydroelectric process, the main sources of electric power begin with the burning of hydrocarbons to create heat, the fission of radioactive elements to create heat, or the tapping of the earth's latent heat. These processes all have in common the concept of utilizing heat to generate electricity. The heat is commonly used to boil water to create steam which expands to drive steam turbines or engines which in turn drive electric generators. These usual processes require two steps and result in conversion efficiencies of typically 5 to 35 percent. Far greater efficiencies could be achieved with a one step process wherein thermal radiation from a heat source would be converted directly to electricity.

Marks, in U.S. Pat. No. 4,445,050, discloses such a one step process. Marks shows the use of a dipole antenna for receiving light photons and converting them directly to electricity. Marks apparently envisions a bank of such antennas mounted on a satellite for generating electricity more efficiently than photovoltaic devices. Such a process with respect to light energy is conceivable because the satellite is outside the otherwise troublesome scattering and absorption processes of the atmosphere and because the satellite is sufficiently far from the sun to prevent overheating. The marks concept, however, is probably not workable within the atmosphere since the light source must be very hot and positioning of the small antennas too close to the source would cause destructive heating, while positioning the antennas at a distance too far from the source would lead to the indicated light scattering and absorption in the intervening space.

Thus, the apparatus of U.S. Pat. No. 4,445,050 may ultimately not be more efficient than the conventional two step processes for converting heat from a heat source by expanding steam and driving a turbine and generator, since electricity obtained at a satellite must be beamed back to earth before being usable.

SUMMARY OF THE INVENTION

The present invention is directed to an apparatus and a method for converting thermal energy to electrical current within the earth's atmosphere. The engine includes a mechanism for emitting thermal energy, the emitting temperature being no greater than 3,500 degrees Centigrade and no less than 100 degrees Centigrade. The engine further includes a dipole antenna having a length no greater than eight microns and no less than one micron. An alternating current to direct current rectifier is connected to the antenna and has a pair of output terminals for connecting to a load.

In a preferred embodiment, the emitting mechanism includes a heat exchanger of a type which allows a plurality of antennas to be located in close proximity without becoming too hot. The antennas are preferably tuned to the mean temperature of the heat exchanger by having lengths approximately the same as or a distribution of lengths centered around $L=B/2T$, where $L$ = length, $B = 2.898 \times 10^{-3}$ meters degrees Kelvin, and $T$ = temperature of the heat exchanger in degrees Kelvin. Groups of three antennas are preferably held in an orthogonal relationship with respect to one another so that heat energy from various directions may be received and converted to electrical energy. It is further preferable to use a plurality of rectifiers to provide full wave rectification.

The method of the present invention is directed to maintaining the heat source at a relatively constant temperature between 100 degrees Centigrade and 3,500 degrees Centigrade. The method also includes locating a dipole antenna for receiving heat radiation from the source. The antenna has a length between one micron and eight microns. The antenna is separated from the heat source by at least a distance sufficient to prevent degradation of the antenna due to intervening conduction and convection. The method further includes rectifying the electrical current created in the antenna for use by a load.

The present invention is thus directed to a closed system apparatus for operation at an earth location. The apparatus is designed to function with thermal radiation in the infrared portion of the electromagnetic spectrum. Such radition may be created by conventional means, including combustion of hydrocarbons. As opposed to a source emitting primarily light or ultraviolet light, however, the heating source of the present invention has a lower temperature and emits thermal energy. Because of the lower source temperature, the antennas may be located near the source without overheating.

These advantages and objects of the invention are further explained hereinafter and may be better understood by reference to the drawings and the description of the preferred embodiment described in detail.

DETAILED DESCRIPTION OF THE PREFERRED EMBODIMENT

Figure 2:
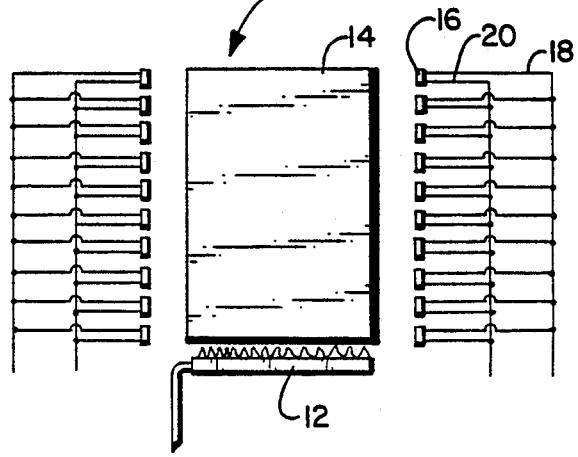
FIG. 2 depicts by illustration a heating source and heat exchanger with a plurality of substrate blocks and wires leading therefrom.

Referring now to the drawings wherein like reference numerals designate identical or corresponding parts throughout the several views, and more particularly to FIG. 2, an apparatus in accordance with the present invention is designated generally by the numeral 10. Device 10 is an engine for converting thermal radiation to direct current electricity. Device 10 includes a heat energy source 12, such as a gas burner. Source 12 heats a heat exchanger 14, such as the enclosed box shown. A plurality of thermal energy receivers 16 with a pair of conductors 18 and 20 extending therefrom are connected in parallel. It is understood, however, that conductors 18 and 20 from the various receivers 16 could as well be connected in series.

Figure 3:
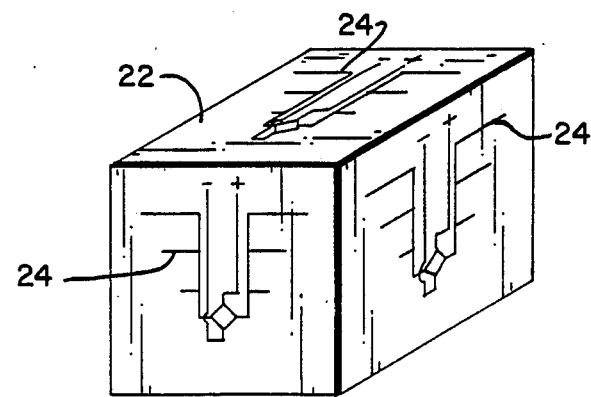
FIG. 3 illustrates a substrate block having three orthogonally oriented antennas attached thereto.

Each receiver 16, as shown in a preferred embodiment in FIG. 3, includes a block 22 of a substrate material which has a high transparency to infrared radiation, especially radiation having wavelengths approximately the same as the wavelengths best received by an antenna 24 attached to or implanted on block 22. It is preferable to orient one antenna 24 orthogonal with respect to another antenna 24 as shown in FIG. 3. Then, the orientation of a particular antenna with respect to heat exchanger 24 is not as critical since the directional component of energy not received by one antenna may be received by the orthogonally oriented antenna. It is understood that not all energy will be absorbed as it passes the antennas, but an orthogonal array provides the highest possibility of receiving the impinging energy. Antennas 24 may be oriented orthogonally in two planes (not shown) or in three planes as shown in FIG. 3. The output terminals of each antenna are preferably connected in series or parallel as discussed hereinbefore.

Figure 1:
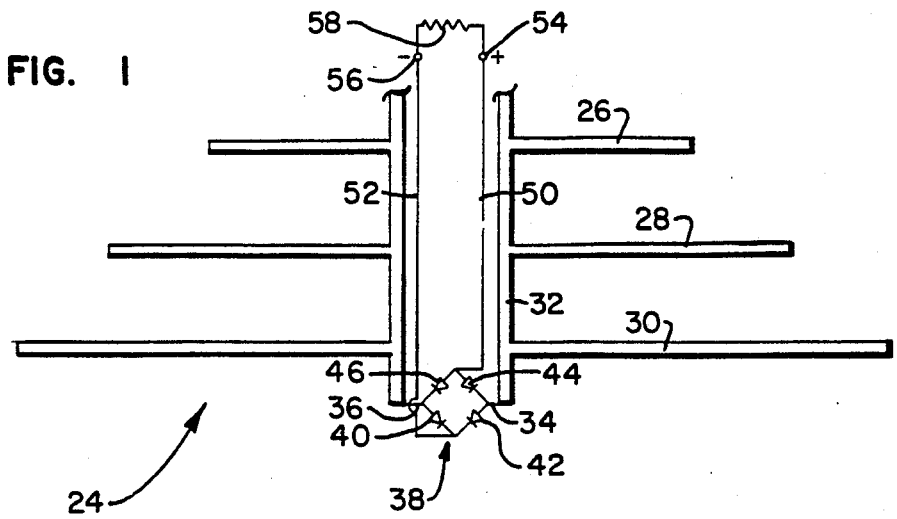
FIG. 1 shows a dipole antenna and AC/DC rectifier in schematic form in accordance with the present invention.

An antenna 24 is shown in more detail in FIG. 1. Antenna 24 includes first, second and third dipoles 26, 28 and 30, all having different lengths. Each half of dipoles 26, 28, 30 are connected to a bus bar 32. Bus bars 32 are connected via lines 34 and 36 to bridge 38. Bridge 38 includes electrical rectifier elements 40, 42, 44 and 46 connected in series such that elements 42 and 44 are in parallel with elements 40 and 46 between lines 50 and 52 leading to output terminals 54 and 56. One bus bar 32 is connected via line 34 between elements 42 and 44, while the other bus bar 32 is connected via line 36 between elements 40 and 46. A load 58 is connected across output terminals 54 and 56.

The present engine 10 for converting thermal energy to electrical current is directed to heat energy having wavelengths greater than one micron, but less than millimeter waves which are created by macroscopic sources. For this reason, antenna 24 has dipoles of length no less than one micron and preferably no greater than eight microns.

The heat source or in the case of FIG. 2, the heat exchanger 14 should have a radiation temperature no greater than 3,500 degrees so that the dipole antennas may be placed sufficiently close so that the engine 24 may be an integral unit comprised of both the heat source and the antennas. The heat source, however, should not have a temperature less than 100 degrees Centigrade since then it will be too cool to emit a meaningful quantity of radiation for conversion.

It is preferable to tune the antenna to the emitting means. Such tuning occurs when the length of the dipole is the same as the wavelengths of the maximum energy level of the energy distribution being emitted. Such tuning occurs when the antenna has a length of $L=B/2T$, where L=length, $B=2.898\times10^{-3}$ meters degrees Kelvin, and T=temperature of the emitting means in degrees Kelvin.

The method of using the present conversion engine includes firstly maintaining the heat source or in the case of FIG. 2 the heat exchanger 14 at a relatively constant temperature between 100 degrees Centigrade and 3,500 degrees Centigrade. Dipole antennas in the form of receivers 16 are next located so as to receive heat radiation from the source or heat exchanger. The antennas have a length between one and eight microns. The antennas are separated from the source or heat exchanger at least by distance sufficient to prevent degradation of the antennas due to intervening conduction and convection. At the same time, the antennas are located as close as possible so as to receive maximum radiation. Radiation received by the antennas is rectified and used by a load. As indicated, in certain circumstances the receiving antennas may be located for exposure directly to the heat source, while in other circumstances a heat exchanger may be desirable. In addition, it is preferable to tune the antennas to the heat source, that is, by using antennas having lengths equal to or having a distribution of lengths about the length $L=B/2T$, where the symbols are defined hereinbefore.

The present engine results in a conversion system vastly more efficient than conventional electrical current creating systems. Engine 10 provides a one step conversion from heat energy to electrical current. Conventional systems first drive a turbine and then convert the mechanical energy to electrical current at a generator. U.S. Pat. No. 4,445,050 shows a one step process, but utilizes light radiation which requires a very hot source and, consequently, cannot be accomplished in an integral unit within the atmosphere. If the system is used on a satellite, then further inefficiencies develop since electrical energy must be transmitted from the satellite to earth. Thus, the present engine is a significant breakthrough in increasing the efficiency of converting energy from our conventional heat source in a one step process to direct electrical current.

Although the present invention has been described in detail and numerous advantages set forth, it is understood that the preferred embodiment shown is exemplary. Consequently, changes made, especially in matters of shape, size and arrangement, to the full extent extended by the general meaning of the terms in which the appended claims are expressed, are within the principle of the invention.

What is claimed is:

1. An engine for converting thermal energy to electrical current comprising:
   a. means for emitting thermal energy, said emitting means having a temperature no greater than 3500 degrees Centigrade and no less than 100 degrees Centigrade;
   b. at least one dipole antenna having a length no greater than eight microns and no less than one micron, said antenna being located to receive energy from said emitting means, said antenna is turned to said emitting means by having a length of $L=B/2T$, where L=length, $B=2.898\times10^{-3}$ meters degrees Kelvin, and T=temperature of said emitting means in degrees Kelvin; and,
   c. an AC/DC rectifier means connected to said antenna, said rectifier means having a pair of output terminals for connecting to a load and providing full wave rectification.

2. An engine in accordance with claim 1 including a plurality of said antennas and said rectifiers and means for connecting in parallel the output terminals of said plurality of rectifiers.

3. An engine in accordance with claim 1 including plurality of said antennas and said rectifiers and means for connecting in series the output terminals of said plurality of rectifiers.

4. An engine in accordance with claim 1 including a plurality of said antennas and means for holding first and second of said antennas orthogonal with respect to one another.

5. The method of obtaining electrical current from a heat source, comprising the steps of:
   a. maintaining said heat source at a relatively constant temperature between 100 degrees Centigrade and 3500 degrees Centigrade;
   b. locating at least one dipole antenna for receiving heat radiation from said source, said antenna having a length between one micron and eight micron, said antenna being separated from said source at least by a distance sufficient to prevent degradation of said antenna due to intervening conduction and convection each of said antennas having a length of approximately $L=B/2T$, where L=length, $B=2.898\times10^{-3}$ meters degrees Kelvin, and T=temperature of said heat exchanger in degrees Kelvin;

c. rectifying the electrical current created in said antenna for use by a load; and, d. locating a heat exchanger between said heat source and said antenna.

* * * * *